United States Patent
Germano

Patent Number: 5,211,380
Date of Patent: May 18, 1993

[54] MOTOR VEHICLE SPRING STRUT

[75] Inventor: Francesco Germano, Sachsenheim, Fed. Rep. of Germany

[73] Assignee: Dr. Ing. h.c.F. Porsche AG, Fed. Rep. of Germany

[21] Appl. No.: 842,493

[22] Filed: Feb. 27, 1992

[30] Foreign Application Priority Data

Feb. 27, 1991 [DE] Fed. Rep. of Germany ....... 4106093

[51] Int. Cl.⁵ .............................................. B60G 13/00
[52] U.S. Cl. .................................. 267/221; 267/220; 280/668
[58] Field of Search .................. 267/33, 34, 152, 153, 267/220, 221, 170, 179; 280/668, 670, 672, 696

[56] References Cited

U.S. PATENT DOCUMENTS

| | | |
|---|---|---|
| 4,175,770 | 11/1979 | Draistach et al. ................ 267/221 |
| 4,256,292 | 3/1981 | Sullivan, Jr. et al. ............. 267/33 |
| 4,260,177 | 4/1981 | Pflughaupt et al. .............. 280/668 |
| 4,434,977 | 3/1984 | Chiba et al. ..................... 267/153 |
| 4,618,127 | 10/1986 | LeSalver et al. ................. 267/220 |

FOREIGN PATENT DOCUMENTS

| | | |
|---|---|---|
| 0046508 | 3/1982 | European Pat. Off. . |
| 0126006 | 11/1984 | European Pat. Off. . |
| 3014869 | 11/1980 | Fed. Rep. of Germany . |
| 2946516 | 5/1981 | Fed. Rep. of Germany ...... 267/221 |
| 3620774 | 1/1987 | Fed. Rep. of Germany . |
| 3826302 | 2/1989 | Fed. Rep. of Germany . |
| 3831338 | 4/1989 | Fed. Rep. of Germany ...... 267/221 |
| 2548972 | 7/1983 | France . |
| 58-174006 | 10/1983 | Japan . |
| 62-286816 | 12/1987 | Japan . |

*Primary Examiner*—Robert J. Oberleitner
*Assistant Examiner*—Chris Schwartz
*Attorney, Agent, or Firm*—Evenson, McKeown, Edwards & Lenahan

[57] ABSTRACT

A motor vehicle spring strut has a separate support on the vehicle body for a coil spring and a shock absorber. The coil spring is supported on a spring pocket held on the body side, and the shock absorber is supported in a vehicle-body-side elastic bearing element. The spring pocket is connected with a stop element by an elastic decoupling member forming a constructional unit and, with the bearing element, is exchangeably fastened to a dome of the vehicle body by screws. This configuration makes the constructional unit and the bearing element exchangeable with respect to the spring strut.

7 Claims, 4 Drawing Sheets

MOTOR VEHICLE SPRING STRUT

BACKGROUND AND SUMMARY OF THE INVENTION

The present invention relates to a spring strut for a motor vehicle and, more particularly, to a spring strut having a separate support on the vehicle body for a coil spring and a shock absorber, with the coil spring supported on a spring pocket held on the vehicle body side, and the shock absorber supported on a vehicle-body-side bearing element having an elasticity.

In supports of spring struts for motor vehicles on the vehicle body, as shown, for example, from German Patent No. DE-A 30 14 869, it is very difficult to carry out an adaptation of the elastic support bearing or of the spring pocket to other wheel loads in a simple manner because of the intimate connection of the spring pocket and the support bearing. In such a construction, the entire support bearing with the spring pocket must then be exchanged for the purpose of an adaptation which results in high expenditures.

It is an object of the present invention to provide a spring strut for a motor vehicle, on which the upper vehicle-body-side support can be adapted partially or entirely in a simple manner to the vehicle loads. Another object of the invention is to make it possible to exchange parts of the support for repair purposes without any problems.

These objects have been achieved in accordance with the present invention by providing a spring pocket connected with a stop element via an elastic decoupling member forming a constructional unit and with a bearing element can be exchangeably fastened on a dome of the vehicle body by screws.

Among the principal advantages achieved by the present invention is the fact that the elastic bearing element connected with the piston rod as well as the spring pocket with the stop element can now be exchanged as a unit. Thus, the elastic bearing element may, for example, be a hydraulic unit or an elastic bearing element, and may have different elasticities adaptable to the required loads.

According to one embodiment of the invention, the stop element of the spring pocket, by way of screws, is fixed with the bearing element on the dome so that either the stop element and the bearing element together or only the stop element or the bearing element is exchangeable. Furthermore, another spring pocket can be connected with the spring pocket which results in the ability to provide coil springs of different diameters. The additional spring pocket comprises a sleeve-shaped element which has a shape corresponding to the spring pocket of the constructional unit and for accommodating the coil spring, for example, of a larger diameter, comprises an angular ring element.

The connection of the bearing element with the piston rod takes place via a sleeve element which, on the one side, is fixedly connected with the bearing element and, on the other side, is screwed onto the piston rod. Disks are connected with the sleeve which interact with fixed stops of the spring pocket during compression and rebounding movements. In order to simplify the mounting, the fastening screws are held on the spring pocket in a pressed-in manner so that, after the loosening of the nuts, an easy exchange becomes possible.

BRIEF DESCRIPTION OF THE DRAWINGS

These and other objects, features, and advantages of the present invention will become more apparent from the following detailed description of several currently preferred embodiments when taken in conjunction with the accompanying drawings where.

DETAILED DESCRIPTION OF THE DRAWINGS

Figure 6:
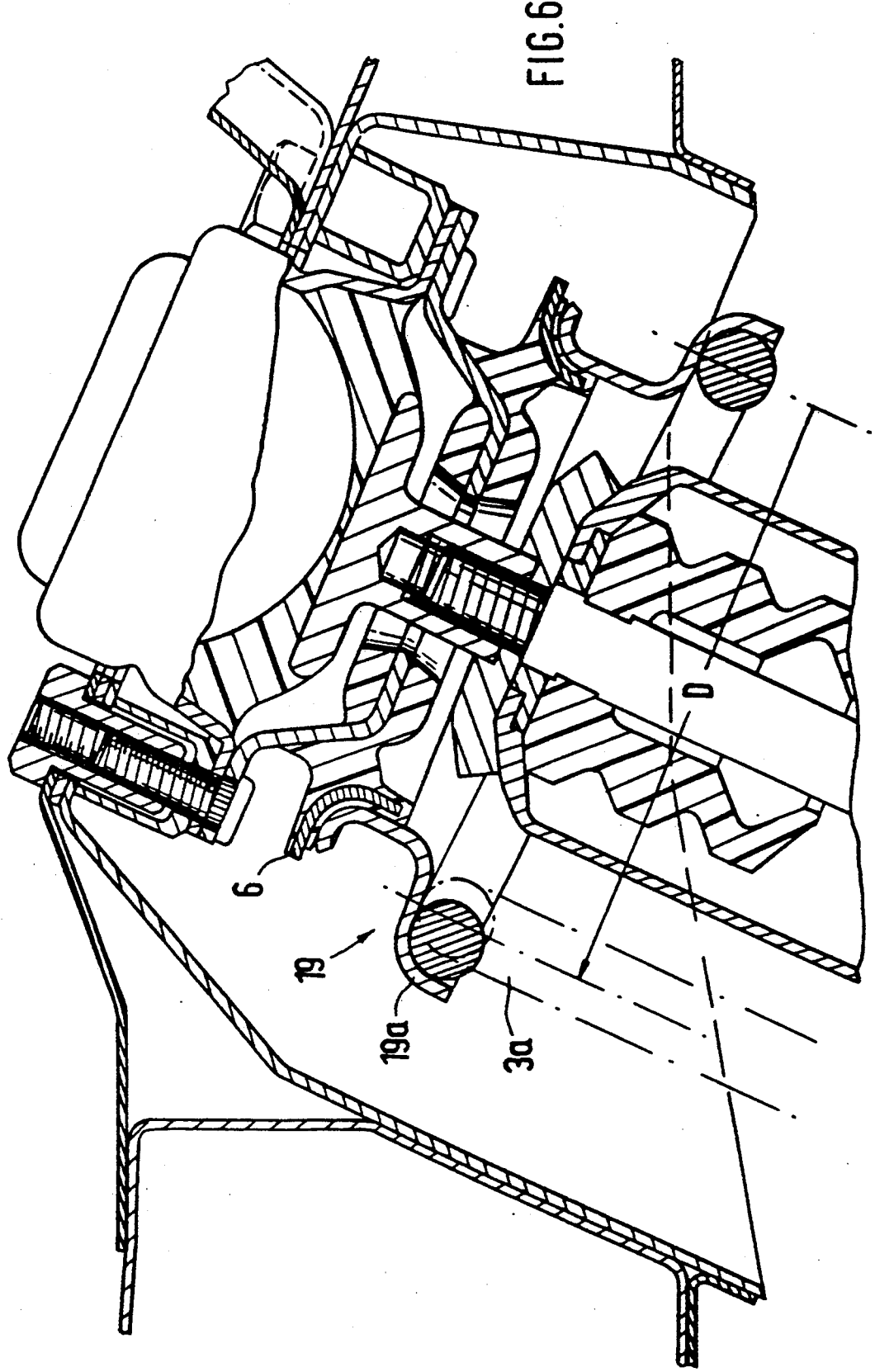
FIG. 6 is a cross-sectional elevation view of a portion of yet another embodiment of a spring strut according to the present invention having a spring pocket for a coil spring of a larger diameter.

Referring now to the drawings, a spring strut 1 comprises a shock absorber 2 consisting of a piston-cylinder unit and a coil spring 3 (FIGS. 1 and 2) or 3a (FIG. 6). With its lower end, the spring strut 1 is connected to the wheel carrier or to a suspension link in a known manner, and its upper end is supported on a vehicle body 4 in an elastic bearing element 5 (FIG. 1) or 11 (FIG. 2).

Figure 1:
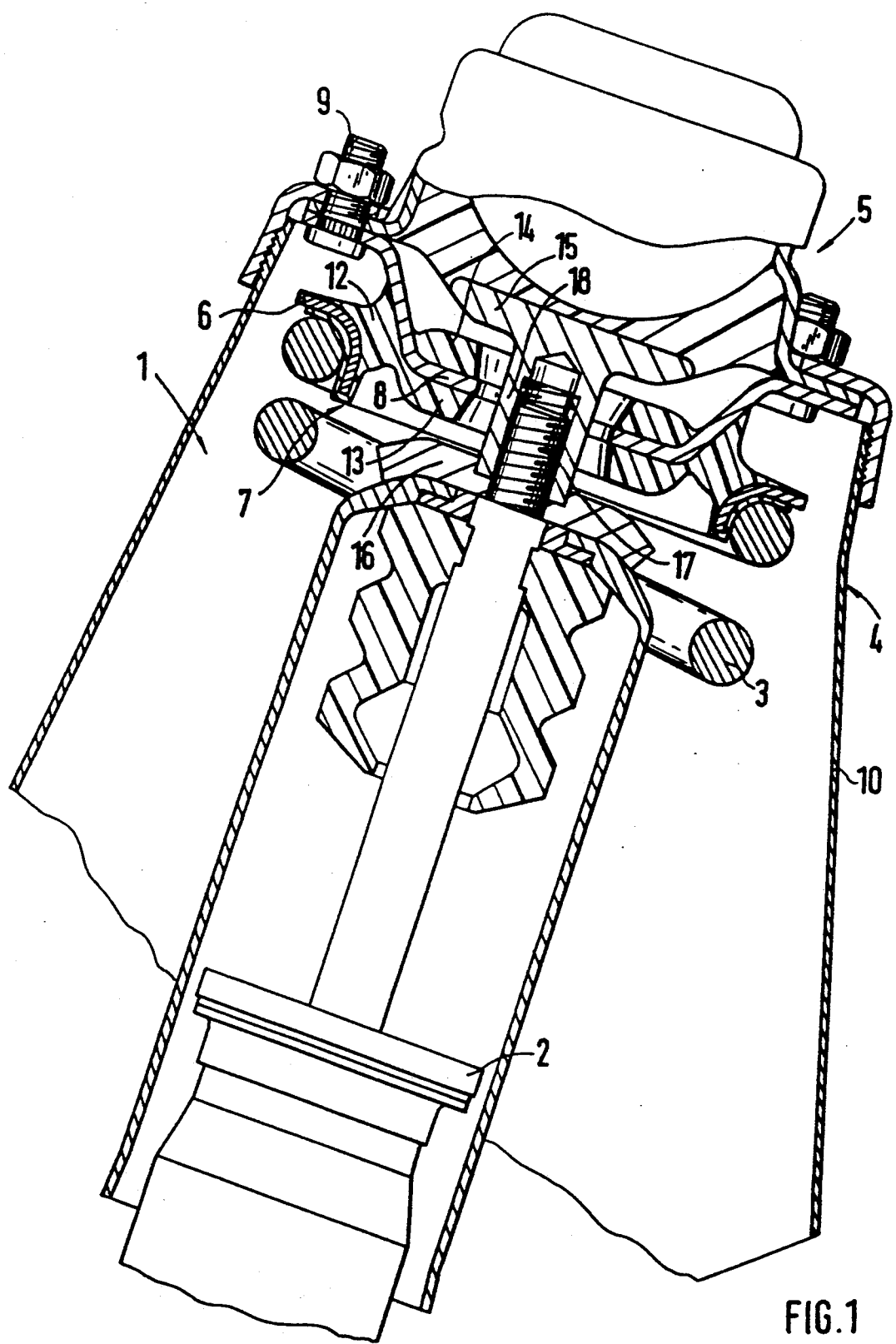
FIG. 1 is a cross-sectional elevation view of a portion of one embodiment of a spring strut according to the present invention comprising a spring pocket having stops and comprising a hydraulic unit.
Figure 2:
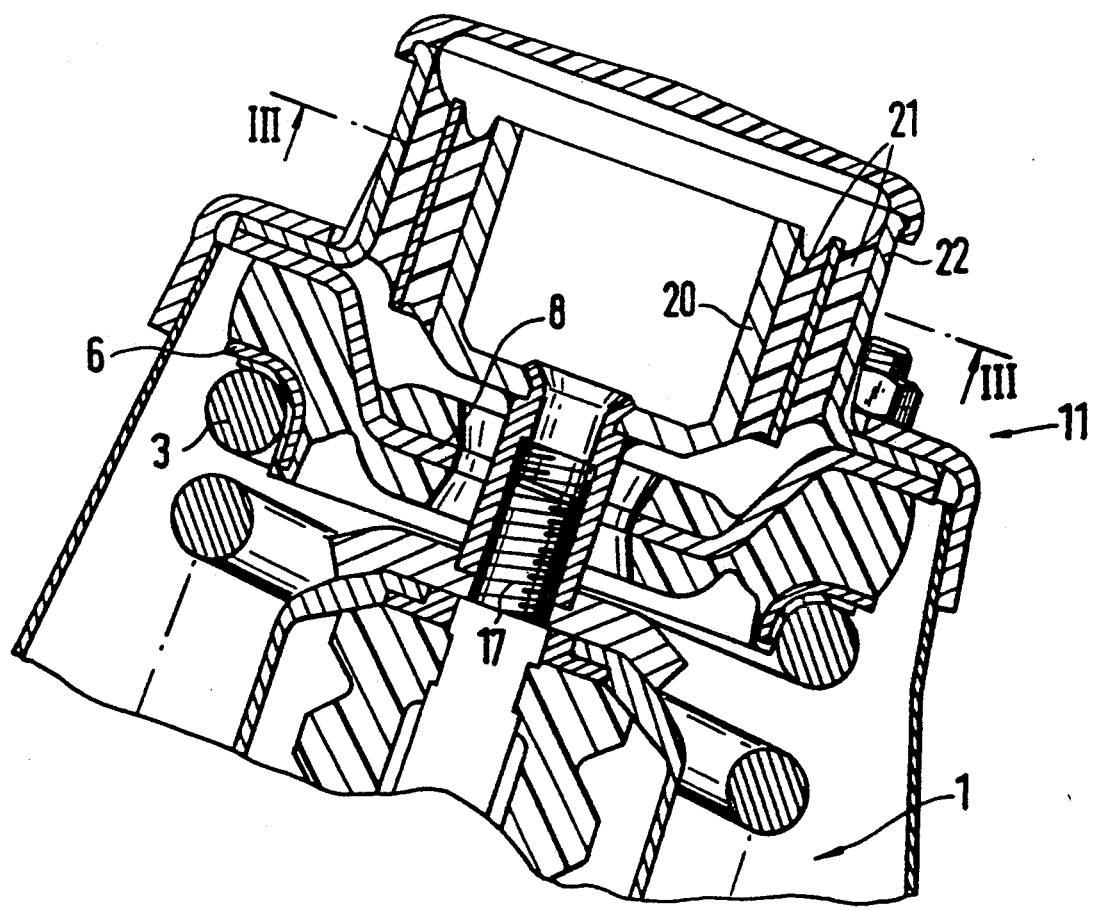
FIG. 2 is a cross-sectional elevation view of a portion of another embodiment of a spring strut according to the present invention comprising a spring pocket having stops and an elastic bearing element.
Figure 3:
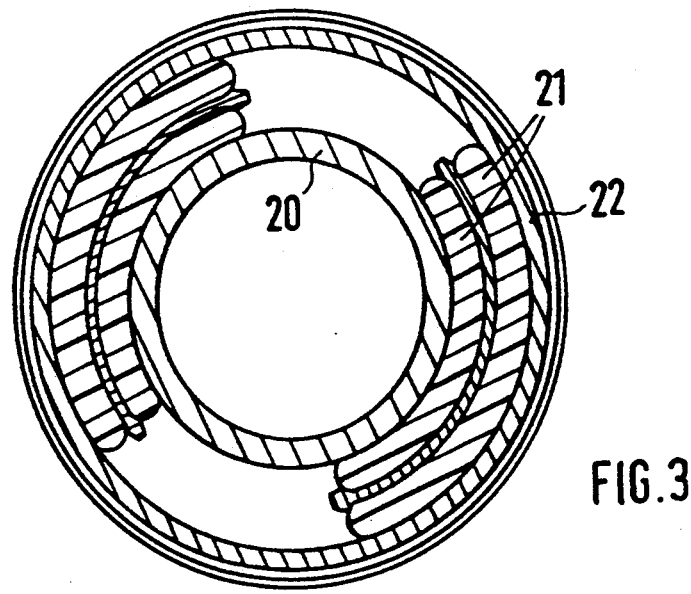
FIG. 3 is a sectional view along line III—III of FIG. 2.
Figure 4:
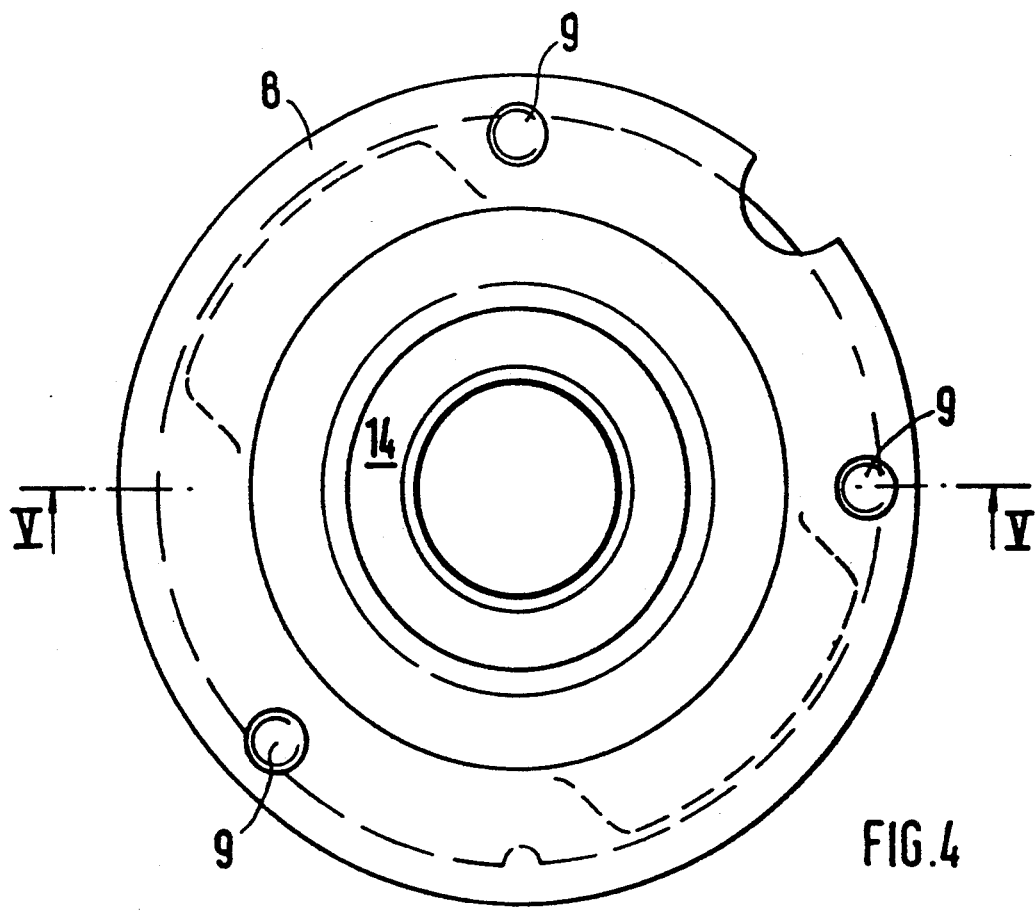
FIG. 4 is a top view of a spring pocket with stops.

As shown in detail in FIG. 1, the shock absorber 2 and the coil spring 3 are held separately on the vehicle body 4. The shock absorber 2 is disposed in the elastic bearing element 5 or 11, and the coil spring 3 is disposed on a spring pocket 6 configured as a constructional unit 7 with a stop element 8 and held by screws 9 on a dome 10 of the vehicle body 4. The elastic bearing element 5 or 11 is also supported on the vehicle body 4 by the screws 9.

By way of an elastic decoupling member 12, the spring pocket 6 is connected in one piece with the stop element 8. Elastic stops 13 and 14 are arranged below and above the element 8 in the compressing and rebounding direction. The fixed elastic stops 13 and 14 are arranged to be corresponding with movable stop faces on disks 16 and 15, respectively, which are connected with the piston rod 17 of the shock absorber 2. One disk 15 is part of the elastic bearing element 5 or 11 and is connected with a sleeve 18 which is fastened on the piston rod 17. The other disk 16 is spaced at a distance from the disk 15 and is supported on the piston rod 17. The compression and rebounding path of the shock absorber 2 is bounded between the disks 15 and 16.

Another spring pocket 6a (FIG. 6) can be connected with the spring pocket 6 and receives a coil spring 3a of a larger diameter D than the spring pocket 6. The spring pocket 6a comprises a sleeve-shaped element whose shape is adapted to the spring pocket 6 as well as an angular ring receiving device 19a for the coil spring 3a.

The elastic bearing element 5 (FIG. 1) consists of a hydraulic unit, and the bearing element 11 (FIG. 2) consists of a bearing element with an elastic characteristic which may differ according to desired effect. The bearing element 11 has a pot 20 connected with the piston rod 17 which, via elastic element 21, is connected with a sleeve-shaped receiving device 22 supported on the dome 10 of the vehicle 4.

Figure 5:
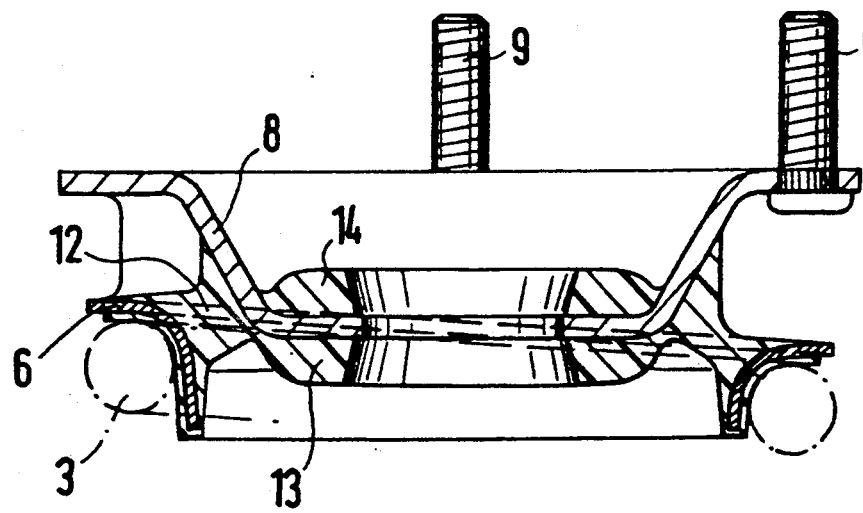
FIG. 5 is a sectional view along line V—V of FIG. 4.

As illustrated in detail in FIG. 5, the spring pocket 6 forms an exchangeable constructional unit 7 with the stop element 8. In addition, the elastic bearing element 5 or 11 can also be provided in an exchangeable manner. As a result, a simple way is provided of either exchanging both units 7 and 5 or 11 or only one unit. This arrangement allows an optimal adaptation to the loads of a vehicle so that different characteristics of the wheel suspension become possible.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A spring strut comprising a coil spring and a shock absorber for a motor vehicle having a separate support on a body of the motor vehicle for the coil spring and the shock absorber, the coil spring being supported on a spring pocket held at the vehicle body side, and the shock absorber being supported in a vehicle-body-side elastic bearing element, a stop element, and an elastic decoupling member connecting the spring pocket with the stop element, the elastic decoupling member forms a constructional unit and, with the bearing element, can be exchangeably fastened on a dome of the vehicle body by screws, the shock absorber has two spaced disks connected to a piston rod, the stop element has an elastic rebounding and compression stop arranged at a distance between the two shock absorber disks, one of the shock absorber disks is an upper disk forming part of the bearing element, and the other shock absorber disk is connected to the upper disk via a sleeve at the piston rod.

2. A spring strut comprising a coil spring and a shock absorber for a motor vehicle having a separate support on a body of the motor vehicle for the coil spring and the shock absorber, the coil spring being supported on a spring pocket held at the vehicle body side, and the shock absorber being supported in a vehicle-body-side elastic bearing element, a stop element, and an elastic decoupling member connecting the spring pocket with the stop element, the elastic decoupling member forms a constructional unit and, with the bearing element, can be exchangeably fastened on a dome of the vehicle body by screws the elastic bearing element is formed of an inserting element having a radial elasticity and the shock absorber has two spaced disks connected to a piston rod, the stop element has an elastic rebounding and compression stop arranged at a distance between the two shock absorber disks, one of the shock absorber disks is an upper disk forming part of the bearing element, and the other shock absorber disk is connected to the upper disk via a sleeve at the piston rod.

3. The spring strut according to claim 1, wherein the elastic bearing element comprises a hydraulic unit which, via fastening screws, can be connected with the constructional unit on the dome of the vehicle body.

4. The spring strut according to claim 1, wherein the elastic bearing element comprises a pot connected with a piston rod of the shock absorber which, by way of elastic inserting elements, is supported in a sleeve-shaped receiving device held on the dome of the vehicle body so as to extend over the dome.

5. A spring strut comprising a coil spring and a shock absorber for a motor vehicle having a separate support on a body of the motor vehicle for the coil spring and the shock absorber, the coil spring being supported on a spring pocket held at the vehicle body side, and the shock absorber being supported in a vehicle-body-side elastic bearing element, a stop element, and an elastic decoupling member connecting the spring pocket with the stop element, the elastic decoupling member forms a constructional unit and, with the bearing element, can be exchangeably fastened on a dome of the vehicle body by screws, the elastic bearing element comprises a hydraulic unit which, via fastening screws, can be connected with the constructional unit on the dome of the vehicle body, the shock absorber has two spaced disks connected to a piston rod, and the stop element has an elastic rebounding and compression stop arranged at a distance between the two shock absorber disks, one of the shock absorber disks is an upper disk forming part of the bearing element, and the other shock absorber disk is connected to the upper disk via a sleeve at the piston rod.

6. A spring strut comprising a first coil spring and a shock absorber for a motor vehicle having a separate support on a body of the motor vehicle for the coil spring and the shock absorber, the coil spring being supported on a first spring pocket held at the vehicle body side, and the shock absorber being supported in a vehicle-body-side elastic bearing element, a stop element, and an elastic decoupling member connecting the spring pocket with the stop element, the elastic decoupling member forms a constructional unit and, with the bearing element, can be exchangeably fastened on a dome of the vehicle body by screws, the spring pocket is constructed for supporting accommodation of a second spring pocket for a coil spring of a larger diameter than the first coil spring and comprises a sleeve-shaped element which, on one side, is adapted to the shape of the first spring pocket and, on another side, has an angular ring receiving device for the larger diameter coil spring, the shock absorber has two spaced disks connected to a piston rod, the stop element has an elastic rebounding and compression stop arranged at a distance between the two shock absorber disks, one of the shock absorber disks is an upper disk forming part of the bearing element, and the other shock absorber disk is connected to the upper disk via a sleeve at the piston rod.

7. A spring strut comprising a coil spring and a shock absorber for a motor vehicle having a separate support on a body of the motor vehicle for the coil spring and the shock absorber, the coil spring being supported on a spring pocket held at the vehicle body side, and the shock absorber being supported in a vehicle-body-side elastic bearing element, a stop element, and an elastic decoupling member connecting the spring pocket with the stop element, the elastic decoupling member forms a constructional unit and, with the bearing element, can be exchangeably fastened on a dome of the vehicle body by screws, the elastic bearing element is formed of an inserting element having a radial elasticity and comprises a pot connected with a piston rod of the shock absorber which, by way of elastic inserting elements, is supported in a sleeve-shaped receiving device held on the dome of the vehicle body so as to extend over the dome, the shock absorber has two spaced disks connected to a piston rod, the stop element has an elastic rebounding and compression stop arranged at a distance between the two shock absorber disks, one of the shock absorber disks is an upper disk forming part of the bearing element, and the other shock absorber disk is connected to the upper disk via a sleeve at the piston rod.

* * * * *